United States Patent [19]

Drusi

[11] Patent Number: 5,041,221
[45] Date of Patent: Aug. 20, 1991

[54] DOUBLE FILTERING OIL FILTER FOR INTERNAL COMBUSTION ENGINES OF MOTOR VEHICLES

[75] Inventor: Alberto Drusi, Turin, Italy
[73] Assignee: Gilardini S. A., Turin, Italy
[21] Appl. No.: 403,937
[22] Filed: Sep. 7, 1989

[30] Foreign Application Priority Data

Sep. 9, 1988 [IT] Italy .................... 53385/88[U]

[51] Int. Cl.$^5$ .............................................. B01D 27/06
[52] U.S. Cl. ................................ 210/323.1; 210/438; 210/440; 210/444; 210/450; 210/451; 210/488; 210/493.1; 210/497.2; 210/DIG. 13; 210/DIG. 17
[58] Field of Search ............. 210/323.1, 440, 444, 210/450, 451, 488, 493.1, 497.01, 497.2, DIG. 13, DIG. 17, 438; 184/6.24; 493/941

[56] References Cited

U.S. PATENT DOCUMENTS

| | | | |
|---|---|---|---|
| 2,359,475 | 10/1944 | Gauthier | 210/488 |
| 2,548,584 | 4/1951 | Briggs | 210/488 |
| 2,748,949 | 6/1956 | James | 210/440 |
| 2,995,253 | 8/1961 | Belgarde et al. | 210/232.2 |
| 3,064,820 | 11/1962 | Gillick, Jr. et al. | 210/488 |
| 4,632,755 | 12/1986 | DeGaffenried | 210/488 |

FOREIGN PATENT DOCUMENTS

| | | | |
|---|---|---|---|
| 544643 | 8/1957 | Canada | 210/488 |
| 1063360 | 12/1953 | France | 210/488 |
| 2093363 | 9/1982 | United Kingdom | 210/488 |

Primary Examiner—W. Gary Jones
Assistant Examiner—Matthew O. Savage
Attorney, Agent, or Firm—Bacon & Thomas

[57] ABSTRACT

A double filtering filter for lubricating oil of internal combustion engines of motor vehicles comprises a cylindrical housing containing a rough filtering cartridge and a superimposed fine filtering cartridge, both in form of cylindrical sleeves and fitted over a tube extending within the rough filtering cartridge from a cover of said housing. A cover is provided with a plurality of peripheral inlet holes for the oil to be filtered, an axial hole for the outlet of the roughly filtered lubricant, and an intermediate radial hole for the outlet of the finely filtered lubricant. The filter further comprises an annular seal gasket on the tube between said two cartridges, and a pair of annular seal gaskets on the cover, one gasket being positioned outside said plurality of peripheral holes for the inlet of the lubricating oil, and the other gasket being positioned between said eccentric outlet hole and said axial outlet hole. The fine filtering cartridge comprises a continuous strip of disks of filter paper, each disk providing for a central hole and radial lobes, said disks being accordion pleated with the lobes of a disk offset in respect of the lobes of an adjoining disk, and sandwiched between two rigid rings also provided with aligned central holes.

6 Claims, 2 Drawing Sheets

DOUBLE FILTERING OIL FILTER FOR INTERNAL COMBUSTION ENGINES OF MOTOR VEHICLES

BACKGROUND OF THE INVENTION

This invention relates to an improved double filtering filter for lubricating oil or lubricant of internal combustion engines of motor vehicles.

Italian Patent No. 1 141 751 discloses a double filtering filter of the type to be screwed, comprising a rough filter cartridge and a fine filter cartridge superimposed together, contained in a cylindrical housing closed by a cover, equipped with a central hole for the lubricating oil undergoing the rough filtering, and an eccentric hole for draining into the oil sump the lubricant undergoing the fine filtering, as well as inlet holes for the lubricant to be filtered.

In the commercial construction of this known filter, the fine filtering cartridge is made up by cotton flock compressed in a box of punched plate shaped as a cylindrical hollow body or sleeve. Therefore, the manufacturing of such cartridge requires the forging of two strips of punched plate forming the inner and outer cylindrical surfaces of the box, their curving as a ring and the folded seam of the opposed ends, and thereafter the fitting of plate disks with central holes as a lower and an upper base of the cartridge, after the filling of the pressed cotton.

This construction results to be expensive due to the installations required for the operation and to the necessary labor.

SUMMARY OF THE INVENTION

The object of the present invention is therefore that of providing a filter of the above mentioned kind, equipped with a fine filtering cartridge having the same filtering quality of the already used pressed cotton cartridges, but with reduced manufacturing costs.

Another object of the invention is that of proposing a few improvements of the filter general structure to render easier its manufacturing without prejudice for the performance thereof.

The above and other objects and advantages of the invention, as will become evident from the following description, are achieved through a double filtering filter for lubricating oil of internal combustion engines of motor vehicles, comprising a cylindrical housing containing a rough filtering cartridge with a superimposed fine filtering cartridge, both being in form of a cylindrical sleeve and being fitted over a tube extending within the rough filtering cartridge from a cover of said housing, said cover being provided with a plurality of peripheral inlet holes for the oil to be filtered, an axial hole for the outlet of the roughly filtered lubricant, and an intermediate radial hole for the outlet of the finely filtered lubricant, said filter further comprising an annular seal gasket on said tube between said two cartridges, and a pair of annular seal gaskets on said cover, one gasket being positioned outside said plurality of peripheral holes for the inlet of the lubricating oil, and the other gasket being positioned between said eccentric outlet hole and said axial outlet hole, the improvement consisting in that said fine filtering cartridge comprises a continuous strip of disks of filter paper, each disk providing for a central hole and radial lobes, said disks being accordion pleated with the lobes of a disk offset in respect of the lobes of an adjoining disk, and sandwiched between two rigid rings also provided with aligned central holes.

A preferred embodiment of the invention will now be disclosed, as a non limiting example, with reference to the accompanying drawings.

DESCRIPTION OF PREFERRED EMBODIMENT

Figure 1:
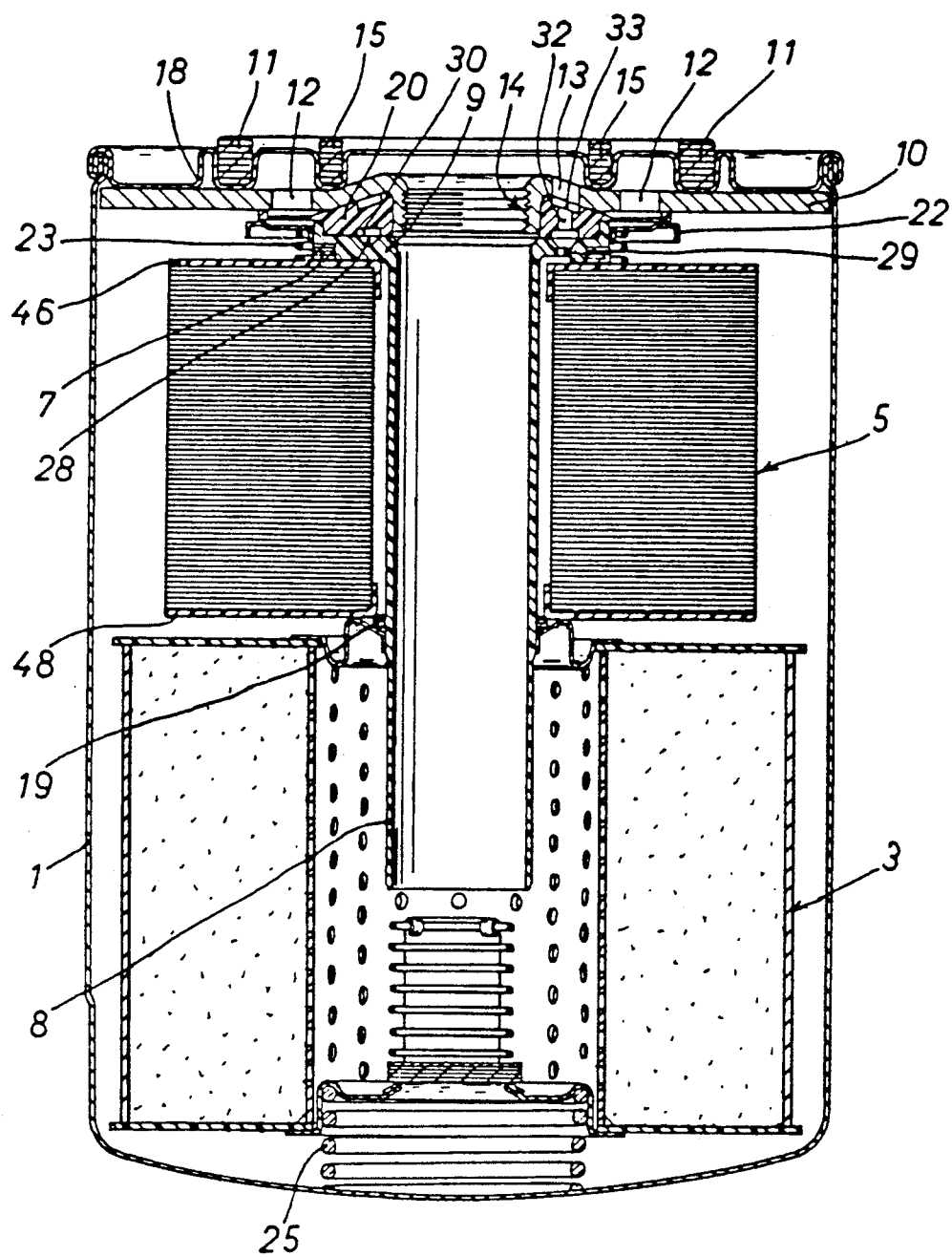
FIG. 1 is an axial cross section view of a filter according to the invention.
Figure 2:
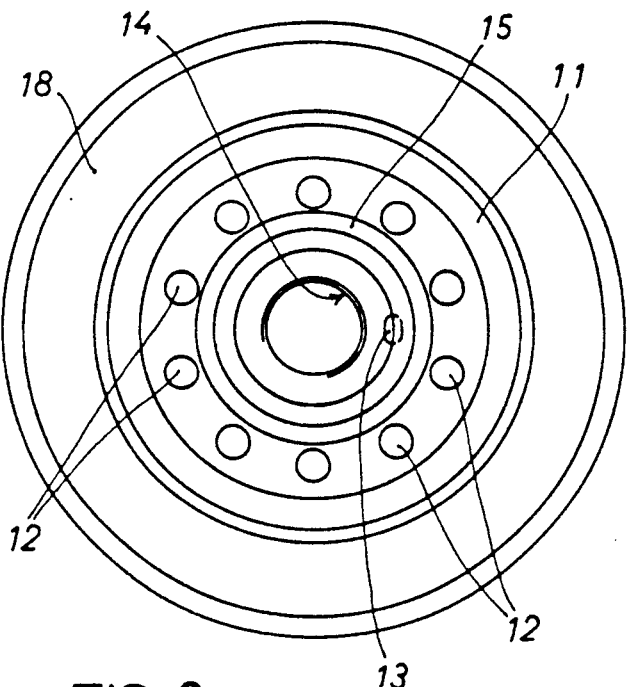
FIG. 2 is a plan top view of the filter of FIG. 1.

With reference to FIGS. 1 and 2, there it is shown a double filtering filter incorporating the improvements according to the invention, the general construction of the filter being such as disclosed by the above mentioned Italian patent. For clarity of illustration, in the present description the basic components of such filter will be mentioned in general, since a detailed description thereof can be found in the above mentioned patent.

Essentially, the filter is made up by a cylindrical housing 1 containing a rough filtering cartridge 3, i.e. adapted to retain particles larger than 15-20 $\mu$m, and a fine filtering cartridge 5, i.e. adapted to retain particles larger, for example, than 3-4 $\mu$m. The rough filtering cartridge 3 is built in a conventional manner, that is by means of a filter element of pleated paper, whereas the fine filtering cartridge according to the main improvement of the present invention will be described in detail later.

Both cartridges are fitted in the form of a sleeve element over a tube 8 molded from synthetic resin, provided with a circular shoulder 9 sealingly abutting against the fine filtering cartridge 5 through the gasket 7.

At its top the filter provides for a rugged metal cover 10 provided with a plurality of peripheral holes 12 for the admission of the lubricating oil to be filtered, a central hole formed in a threaded fitting or nipple, for the outlet of the roughly filtered lubricant, and an eccentric hole 13 which is in a radially intermediate position between the peripheral holes 12 and the central hole 14, for the purpose of draining into the sump the finely filtered lubricant.

Above the cover 10 a ring 18 is located which is sealingly fastened to the housing 1 and provided with circular concentric grooves acting as seats for an outer seal gasket 11 and for an intermediate gasket 15 for realizing an outward seal and between the finely filtered lubricant and the incoming lubricant, respectively. The ring 18 is provided with holes corresponding to those provided on the cover 10, but that may not be coaxial with such holes.

An annular gasket 19 having a circular cross section is located between the two cartridges 3 and 5 and the outer surface of the tube 8, so as to divide the roughly filtered lubricant—that passed through the cartridge 3 from outside inwards—from the finely filtered lubricant—that passed through the cartridge 5 from outside inwards.

Between the circular shoulder 9 of tube 8 and the cover 10 it is positioned a yelding ring 20 of synthetic rubber or the like, adapted to cover with its peripheral portion the holes 12 for the lubricant inlet. Under the yelding ring 20 is coaxially mounted a rigid disk 22 against which reacts a helical spring 23 abutting against the fine filtering cartridge 5.

According to the invention, the shoulder 9 of the tube 8 provides for a circular groove 28 in correspondence of the hole 29 for the outlet of the fine filtered lubricant. A complementary groove 30 is formed on the ring 20 in the face toward the circular shoulder 9. Further a hole 32 provides a communication between the groove 30 and the groove 33 formed on the opposite surface of the yelding ring 20, to convey the lubricant to the outlet hole in the cover. Such construction of the tube shoulder and of the yelding ring 20 allows for an easier assembling of the filter components in the manufacturing thereof, since it provides for a communication between holes 29, 32 and 13 without requiring their alignement, as on the contrary it is shown in the figure. Namely, the grooves 28, 30 and 33 ensure the oil passage from cartridge 5 to hole 13 of the cover for any arrangement, even offset, of the above mentioned holes.

The invention further relates to the type of the double filtering cartridge employed.

Figure 3:
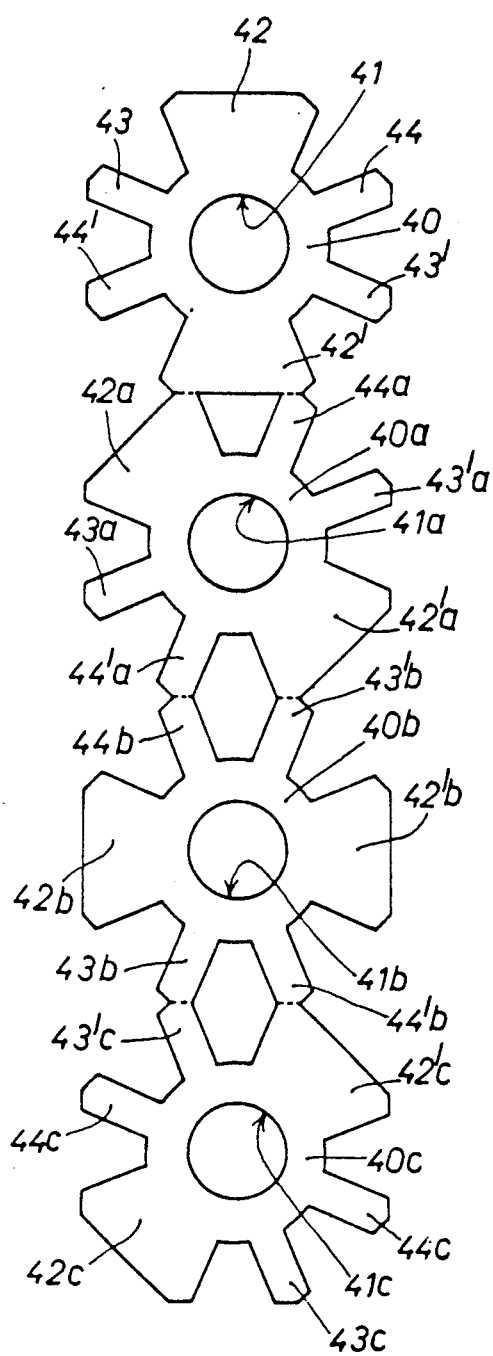
FIG. 3 is a plan top view of a detail of the fine filtering cartridge in the extended (opened) configuration.
Figure 4:
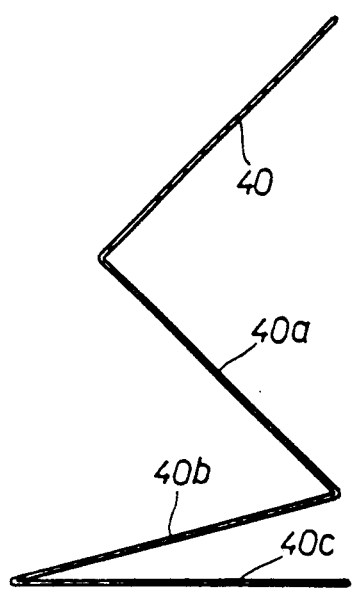
FIG. 4 is a side view of the detail of FIG. 3 partially pleated.

Instead of a cartridge made up by pressed cotton within a housing of punched plate, as disclosed in the above mentioned patent, or of a pleated paper cartridge having the same structure of the rough filtering cartridge but with finer holes as proposed by other manufacturers, the double filtering filter according to the invention employs a paper cartridge having a special lobed structure, as shown in FIGS. 3 and 4.

The cartridge comprises a continuous strip of adjacently connected paper punched disks 40, 40a, 40b, 40c (and so on for the other not shown disks), each having a central hole 41, 41a, 41b, 41c and radial lobes such as 42, 42', 43, 43', 44, 44' as shown for disk 40. The corresponding lobes on the other disks 41a, 41b and 41c have been marked with the same reference numerals with the addition of letter a, b or c, respectively.

Each disk is positioned on the strip rotated with respect to the preceding one, and is preferably connected to the adjacent disk through at least one lobe, and preferably through two lobes. According to a preferred embodiment, each disk comprises two major lobes 42, 42' and four minor lobes 43, 43' and 44, 44'. The disks are accordion pleated as shown in FIG. 4, so that the offset lobes overlap each other in such a manner to form a three-dimension filtering maze which is highly effective, economically manufactured and of compact structure. To form the final cartridge 5 the pack of the stacked disks is sandwiched between two opposed reinforcing rings 46 and 48 as shown in FIG. 1.

Preferably the employed paper incorporates wool fibers and is of the type known as "wool paper".

In the operation of the filter most of the lubricating oil passes through the cartridge 3 and comes out through the axial hole 14, whereas a small amount passes inwardly through the fine filtering cartridge 5 and out through the hole 13 to be discharged to the sump where a pressure lower than that within the engine causes a pressure difference across the cartridge 5 enough for such oil fraction to overcome the greater hydraulic resistance offered by the cartridge 5. It is thus possible to carry out a rough filtering of almost all the flow of oil, and a fine filtering of a part thereof.

A preferred embodiment of the invention has been disclosed, but of course it is subject to several modifications and changes without departing from the scope of the invention.

I claim:

1. In a double filtering filter for lubricating oil of internal combustion engines of motor vehicles, comprising a cylindrical housing containing a rough filtering cartridge with a superimposed fine filtering cartridge, both cartridges being in the form of a cylindrical sleeve and being fitted over a tube extending within the rough filtering cartridge from a cover of said housing, said cover being provided with a plurality of peripheral inlet holes for the oil to be filtered, an axial hole for the outlet of the roughly filtered lubricant, and an intermediate eccentric hole for the outlet of the finely filtered lubricant, said filter further comprising an annular seal gasket on said tube between said two cartridges, and a pair of annular seal gaskets on said cover, one gasket being positioned outside said plurality of peripheral holes for the inlet of the lubricating oil, and the other gasket being positioned between said plurality of peripheral holes and said intermediate eccentric outlet hole, the improvement comprising said fine filtering cartridge comprising a continuous strip of connected disks of filter paper, each disk including a central hole and a plurality of outwardly extending radial lobes wherein at least one of the lobes of each disk is connected to at least one of the lobes of an adjacent disk, said strip of disks being accordian folded with the lobes of each disk offset with respect to the lobes of an adjoining disk, said accordian folds disposed at the lobe connections, said disk being sandwiched between two rigid rings that are also provided with aligned central holes; and said peripheral holes, fine filtering cartridge, tube, gaskets, and intermediate eccentric outlet hole being arranged such that circulation of lubricating oil is from outside the fine filtering cartridge to inside of same.

2. The improvement in a double filtering filter as claimed in claim 1 further comprising a circular radially extending shoulder connected to the end of said tube adjacent said cover and a yielding ring disposed between said shoulder and cover in sealing relationship; said shoulder including a first fine filtered oil outlet and a first groove facing said yielding ring; said first fine filtered oil outlet communicating with said first groove; said yielding ring including a second fine filtered oil outlet and second and third circular grooves on opposite sides of said ring in communication with said second fine filtered oil outlet, said first groove being in alignment with said second groove, and said third groove being in alignment with said eccentric hole of said cover; said first fine filtered oil outlet being in communication with the interior area of said fine filtering cartridge.

3. The improvement in a double filtering filter as claimed in claim 2 wherein said shoulder is integral with said tube and wherein said first fine filtered oil outlet communicates with an interior area of the fine filtering cartridge located between the fine filtering cartridge and the exterior of said tube.

4. The improvement as claimed in claim 2 wherein each of said disks of said fine filtering cartridge comprise six lobes, two major lobes and four minor lobes.

5. The improvement as claimed in claim 4 wherein the positions of the lobes of adjacent disks along the length of the continuous strip are located in progressively rotated orientation.

6. A double filtering filter for lubricating oil of internal combustion engines of motor vehicles, comprising: a cylindrical housing containing a rough filtering cartridge with a superimposed fine filtering cartridge, both cartridges being in the form of a cylindrical sleeve and being fitted over a tube extending within the rough filtering cartridge from a cover of said housing; said cover being provided with a plurality of peripheral inlet holes for the oil to be filtered; an axial hole for the outlet of the roughly filtered lubricant, and an intermediate eccentric hole for the outlet of the finely filtered lubricant; an annular seal gasket on said tube between said two cartridges, and a pair of annular seal gaskets on said cover, one gasket being positioned outside said plurality of peripheral holes for the inlet of the lubricating oil, and the other gasket being positioned between said plurality of peripheral holes and said intermediate eccentric outlet hole; and fine filtering cartridge comprising a continuous strip of disks of filter paper, each disk including a central hole and radial lobes, said disks being accordian folded with the lobes of each disk offset with respect of the lobes of an adjoining disk, said disks being sandwiched between rigid rings that are also provided with aligned central holes; a circular radially extending shoulder connected to the end of said tube adjacent said cover and a yielding ring disposed between said shoulder and cover in sealing relationship; said shoulder including a first fine filtered oil outlet and a first groove facing said yielding ring; said first fine filtered oil outlet communicating with said first groove; said yielding ring including a second fine filtered oil outlet and second and third circular grooves on opposite sides of said ring in communication with said second fine filtered oil outlet, said first groove being in alignment with said second groove and said third groove being in alignment with said eccentric hole of said cover; said first fine filtered oil outlet being in communication with the interior area of said fine filtering cartridge.

* * * * *

UNITED STATES PATENT AND TRADEMARK OFFICE
CERTIFICATE OF CORRECTION

PATENT NO. : 5,041,221
DATED : August 20, 1991
INVENTOR(S) : Alberto DRUSI

It is certified that error appears in the above-identified patent and that said Letters Patent is hereby corrected as shown below:

On the Title page, item [73] Assignee: Gilardini S.P.A.

Signed and Sealed this

Fifteenth Day of June, 1993

Attest:

MICHAEL K. KIRK

Attesting Officer

Acting Commissioner of Patents and Trademarks